(12) United States Patent
Hirata

(10) Patent No.: US 7,416,585 B2
(45) Date of Patent: Aug. 26, 2008

(54) FUEL VAPOR ADSORPTION FILTERS

(75) Inventor: Ryu Hirata, Kariya (JP)

(73) Assignee: Toyota Boshoku Kabushiki Kaisha, Aichi-ken (JP)

( * ) Notice: Subject to any disclaimer, the term of this patent is extended or adjusted under 35 U.S.C. 154(b) by 308 days.

(21) Appl. No.: 11/159,823

(22) Filed: Jun. 23, 2005

(65) Prior Publication Data
US 2005/0284298 A1 Dec. 29, 2005

(30) Foreign Application Priority Data
Jun. 24, 2004 (JP) ............................. 2004-186687

(51) Int. Cl.
*B01D 39/14* (2006.01)
*F02M 35/02* (2006.01)

(52) U.S. Cl. ..................... 96/135; 95/154; 427/202

(58) Field of Classification Search .................. 96/134, 96/135, 147, 153, 154; 55/385.3, DIG. 5; 123/518, 198 E; 442/417; 427/202, 244
See application file for complete search history.

(56) References Cited

U.S. PATENT DOCUMENTS

| | | | | |
|---|---|---|---|---|
| 4,418,662 A | * | 12/1983 | Engler et al. | ............... 96/133 |
| 4,433,024 A | * | 2/1984 | Eian | ............................. 428/198 |
| 4,604,313 A | * | 8/1986 | McFarland et al. | ........... 428/172 |
| 5,486,410 A | * | 1/1996 | Groeger et al. | ............... 442/353 |
| 6,703,072 B2 | * | 3/2004 | Fu et al. | ...................... 427/201 |
| 2002/0129711 A1 | * | 9/2002 | Oda et al. | ....................... 96/134 |
| 2005/0279210 A1 | * | 12/2005 | Hirata | ........................... 96/138 |

FOREIGN PATENT DOCUMENTS

| | | |
|---|---|---|
| JP | 2002-011311 | 1/2002 |
| JP | 2002-115158 | * 4/2002 |
| JP | 2002-276486 | 9/2002 |

\* cited by examiner

*Primary Examiner*—Frank M. Lawrence
(74) *Attorney, Agent, or Firm*—Patterson, Thuente, Skaar & Christensen, P.A.

(57) ABSTRACT

A fuel vapor adsorption filter for mounting within an intake air channel connected to an engine extends across the intake air channel in order to adsorb fuel vapor within the intake air channel when the engine has been stopped. The filter includes an adsorbing agent for adsorbing the fuel vapor. A holding layer is formed by a first non-woven fabric and serves to contain and hold the adsorbing agent. The first non-woven fabric is formed of thermoplastic resin fibers. A cover layer is made of a second non-woven fabric and serves to cover at least one side of the holding layer opposing the downstream side of the intake air channel. The second non-woven fabric is formed of thermoplastic resin fibers. The resin fibers forming the second non-woven fabric of the cover layer have an average diameter between 100 μm and 330 μm.

2 Claims, 5 Drawing Sheets

FUEL VAPOR ADSORPTION FILTERS

This application claims priority to Japanese patent application serial number 2004-186687, the contents of which are incorporated herein by reference.

BACKGROUND OF THE INVENTION

1. Field of the Invention

The present invention relates to fuel vapor adsorption filters, and in particular to fuel vapor adsorption filters that are mounted within an intake air channel and extend across the intake air channel. The intake air channel is connected to an engine, e.g., an internal combustion engine, in order to adsorb fuel vapor within the intake air channel when the engine has stopped.

2. Description of the Related Art

Japanese Laid-Open Patent Publication No. 2002-276486 teaches a known fuel vapor adsorption filter. As shown in FIG. 7, a fuel vapor adsorption filter 90 of this publication is constituted by activated carbon granules 91 interleaved between holding layers 94 made of non-woven fabrics. The activated carbon granules 91 are bonded to the holding layers 94 by adhesive layers 92. In addition, the holding layers 94 are covered with heat-resisting nets 96. The heat-resisting nets 96 keep flames from not directly affecting the holding layers 94 of the fuel vapor adsorption filter when the engine has backfired.

However, if the mesh of the heat resisting net 96 is not fine enough, flames produced by an engine backfire may directly affect the holding layers 94, which are made of non-woven fabrics, through the openings of the net 96. On the contrary, if the mesh of the heat resisting net 96 is too fine, the resistance against the flow of the air through the net 96 may increase, causing an insufficient flow rate of intake air to be supplied to the engine.

SUMMARY OF THE INVENTION

It is accordingly an object of the present invention to teach fuel vapor adsorption filters that can reliably protect the adsorption material holding layers against engine backfires and that can inhibit an increase in the resistance against the flow of intake air.

In one aspect of the present teachings, fuel vapor adsorption filters for mounting within an intake air channel connected to an engine are taught. The filters extend across the intake air channel in order to adsorb a fuel vapor within the intake air channel when the engine has been stopped. The filters include an adsorbing agent for adsorbing the fuel vapor. A holding layer is formed by a first non-woven fabric and serves to contain and hold the adsorbing agent. The first non-woven fabric is formed from thermoplastic resin fibers. A cover layer is made of a second non-woven fabric and serves to cover at least the one side of the holding layer opposing the downstream side of the intake air channel. The second non-woven fabric is also formed from thermoplastic resin fibers. The resin fibers forming the second non-woven fabric of the cover layer may have an average diameter between 100 μm and 330 μm.

With this arrangement, the cover layer for covering at least one side of the holding member opposing the downstream side of the intake air channel is made of the second non-woven fabric in which resin fibers are more intricate (i.e., finer) in comparison with a known heat resisting net. Therefore, the number of the lapped fibers in the second non-woven fabric may be greater than the number of the fibers in the known net, assuming that the weight per unit area is the same. In addition, since the fibers are more intricate in the cover layer, the appearance of the mesh in the cover layer may be finer (i.e., more dense) than the mesh of the net, assuming that the resistance against passage of air is the same. Further, the cover layer may not be easily susceptible to being melted and broken by any instantaneous backfire flames because the diameter of the second non-woven fabric forming the cover layer is chosen to be larger than 110 μm, a minimum diameter that should provide a sufficient heat capacity.

Consequently, assuming that the resistance to the passage of air is the same, the number of overlapped fibers in the non-woven fabric of the cover layer is greater than those of the known net. In addition, the appearance of the mesh in the non-woven fabric is finer than that of the know net. Therefore, the performance of the holding layer for protecting the fuel adsorption agent, such as activated carbon granules or fibers, against engine backfire flames can be improved.

Further, because the diameter of the resin fibers of the second non-woven fabric forming the cover layer is chosen to be less than 330 μm, the cover layer may have the qualities of a low resistance performance against the passage of air and an improved performance for holding the fuel vapor adsorption agent, without suffering from an impermissible increase of weight per unit area.

In one embodiment, the second non-woven fabric forming the cover layer has a weight per unit area between 70 $g/m^2$ and 800 $g/m^2$. Within this range determination, it may be possible for the resistance of the filter to the passage of air to be reduced to a permissible value, while reliably preventing the fuel vapor adsorption agent from being inadvertently removed or dropped from the second non-woven fabric.

In another embodiment, applying hot air to melted resin ejected by a resin injection device forms the fibers of the second non-woven fabric. The formed fibers are substantially continuously laid on the first non-woven fabric of the holding layer in order to form a second non-woven fabric. Since the formed fibers are directly laid over the first non-woven fabric of the cover layer, the fibers of the second non-woven fabric may be bonded to the first non-woven fabric at the same that the second non-woven fabric is formed. Therefore, it is possible to prevent the adsorption agent contained in the first non-woven fabric from being damaged by a flapping cover layer during the manufacturing operation of the filter. Furthermore, the second non-woven fabric of the cover layer is composed of formed resin fibers that have a relatively long length (i.e., average length). Therefore, the heat capacity of the cover layer may be increased and a potential fuzziness of the surface of the second non-woven fabric may be reduced. Consequently, the cover layer may be further prevented or inhibited from being melted and broken by flames produced during the backfiring of an engine.

In a further embodiment, the first non-woven fabric is formed by fibers that have an average diameter of between 20 μm and 60 μm. Therefore, it is possible to increase the number of the fibers while minimizing the increase of the resistance to the passage of air. Inclusion of an adsorption agent in the fibers of the first non-woven fabric may ensure that the first non-woven fabric reliably holds the adsorption agent. In addition, the fibers may easily become entangled with the adsorption agent. Such entangling may reliably encase the adsorption agent within the fibers, improving the performance of holding the adsorption agent.

DETAILED DESCRIPTION OF THE INVENTION

Each of the additional features and teachings disclosed above and below may be utilized separately or in conjunction with other features and teachings to provide improved fuel vapor adsorption filters and methods of manufacturing such adsorption filters. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

First Representative Embodiment

Figure 1:
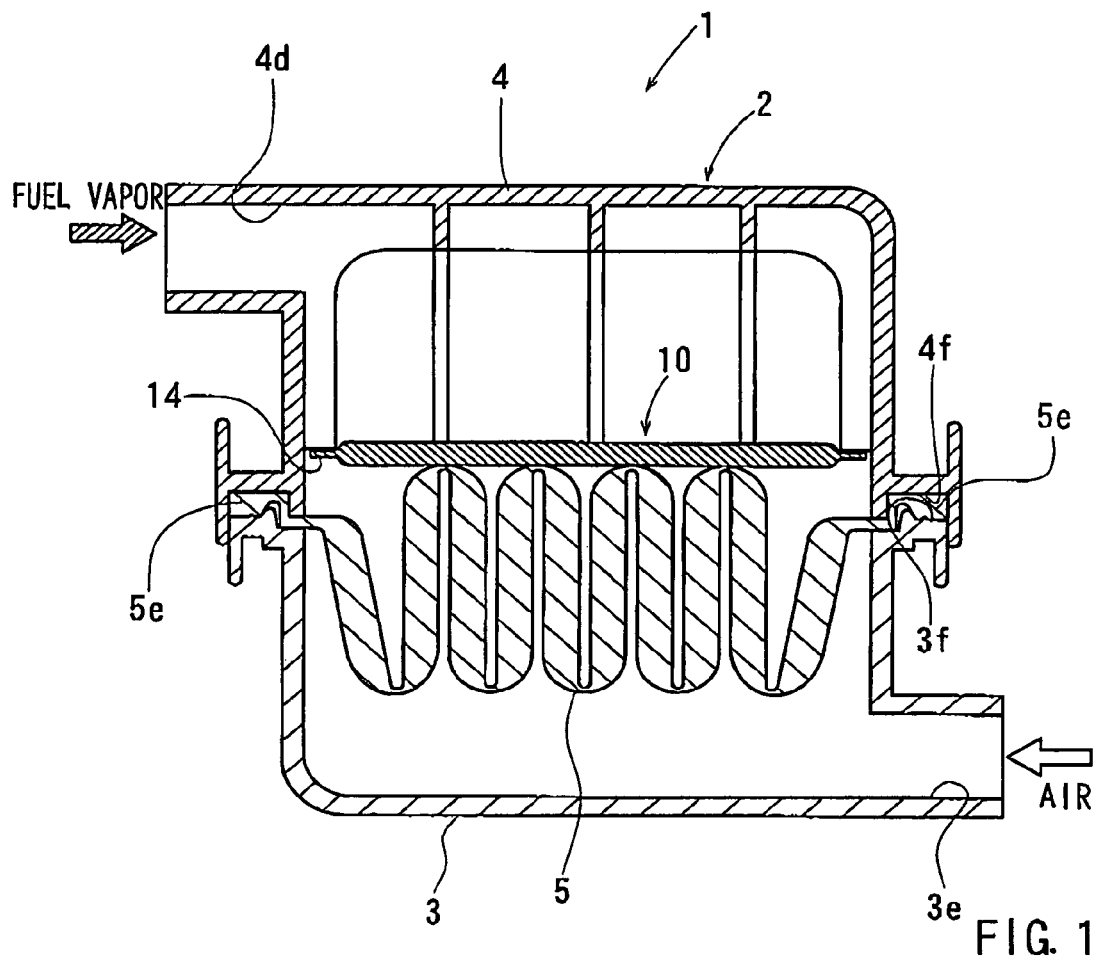
FIG. 1 is a perspective view of a vertical sectional view of an air cleaner incorporating a representative fuel vapor adsorption filter.

A first representative embodiment of the present invention will now be described with reference to FIGS. 1 to 6. Referring to FIG. 1, there is shown an air cleaner 1 that includes a fuel vapor adsorption filter 10.

The air cleaner 1 has a housing 2 that is molded of synthetic resin. The housing 2 includes a lower housing 3 and an upper housing 4 that respectively have an inlet port 3e and an outlet port 4d. The upper side of the lower housing 3 and the lower side of the upper housing 4 are open. An air cleaner element 5 has an outer peripheral frame 5e that is clamped between an upper edge 3f of the lower housing 3 and a lower edge 4f of the upper housing 4. With this arrangement, the air cleaner element 5 is fixed in position so as to extend across the space within the housing 2 in order to filter intake air that is supplied to an engine (not shown).

The fuel vapor adsorption filter 10 is mounted within the housing 2 and is disposed on the downstream side (i.e., the upper side as viewed in FIG. 1) so as to extend across the space within the housing 2. The fuel vapor adsorption filter 10 permits passage of intake air during the operation of the engine. However, when the engine has stopped the fuel vapor adsorption filter 10 adsorbs fuel vapor contained within the intake air flowing through an intake air channel in order prevent the potential leakage of the fuel vapor to the outside environment. In this representative embodiment, the housing 2 constitutes a part of the intake air channel.

Figure 2:
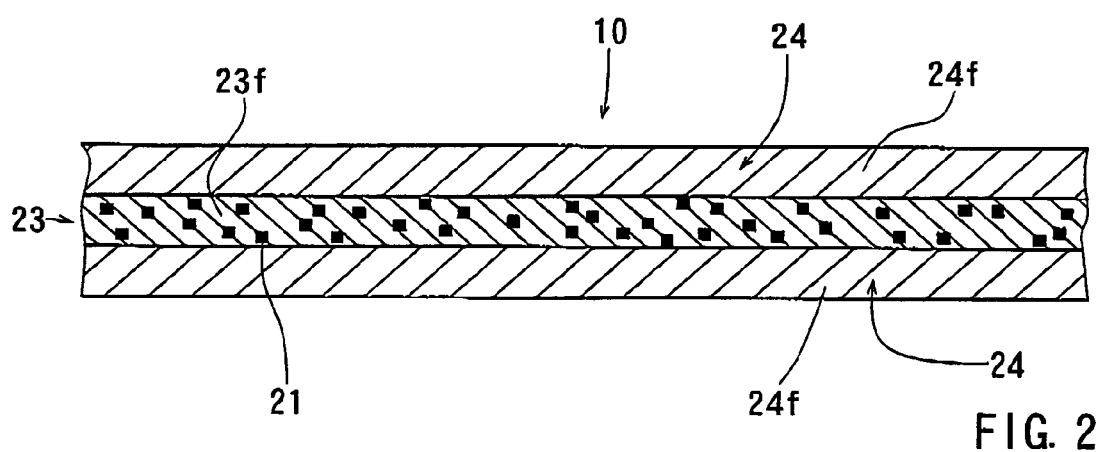
FIG. 2 is a schematic vertical sectional view of the filter.
Figure 3:
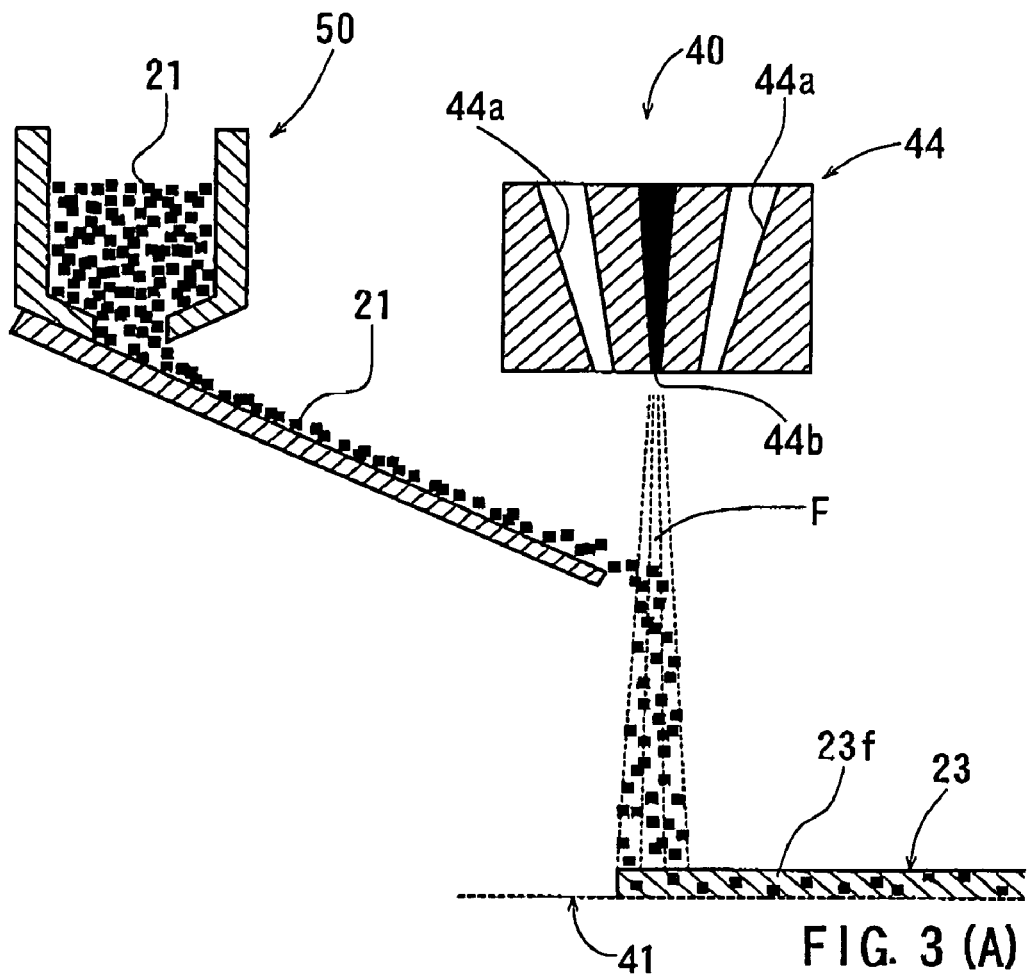
FIG. 3(A) is a schematic view showing a representative method or apparatus for manufacturing a holding layer of the filter.
FIG. 3(B) is a schematic vertical sectional view of a holding layer shown in FIG. 3(A)
Figure 3:
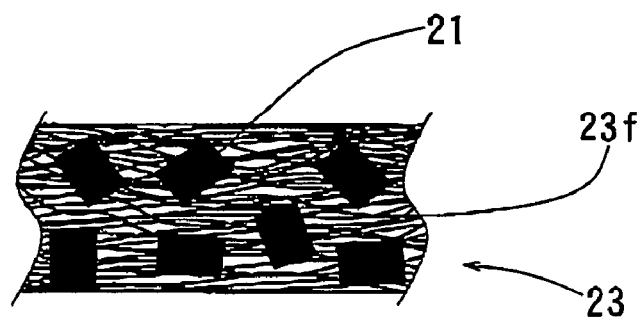

As shown in FIG. 2, the fuel adsorption filter 10 includes activated carbon granules 21 serving as a fuel vapor adsorption material, a holding layer 23 for holding the activated carbon granules 21, and cover layers 24 for covering the holding layer 23.

The holding layer 23 is made of non-woven fabric 23f that serves to contain and hold the activated carbon granules 21.

A representative apparatus and a representative method of manufacturing the non-woven fabric 23f forming the holding layer 23 will now be described with reference to FIGS. 3(A) and 3(B).

Referring to FIG. 3(A), a non-woven fabric manufacturing apparatus 40 for forming the non-woven fabric 23f has a conveyor 41 extending in a substantially horizontal direction. A fiber-forming nozzle 44 is located above the conveyor 41 and is oriented downward. For example, the fiber-forming nozzle 44 may be a nozzle that utilizes a melt-blown technique. Thus, a molten resin may be ejected from a central resin injection hole 44b of the fiber-forming nozzle 44. Hot air blowing holes 44a are formed around the central resin injection hole 44b and blow hot air towards the molten resin ejected from the central resin injection hole 44b, forming resin fibers F. An activated carbon supply device 50 is disposed on the upstream side (i.e., the left side as viewed in FIG. 3(A)) of the fiber-forming nozzle 44. The activated carbon supply device 50 serves to supply activate carbon granules 21 to the formed resin fibers F by utilizing the force of gravity, so that the activated carbon granules 21 contact with the flow of the formed resin fibers F while they are still in a semi-melted state (i.e., an incompletely solidified state).

Since the activated carbon granules 21 supplied from the activated carbon supply device 50 fall into the flow of the semi-melted resin fibers F during the forming process, the activated carbon granules 21 contact with the semi-melted resin fibers F and are contained in and among the resin fibers F. The resin fibers F containing the activate carbon granules 21 then fall onto the conveyor 41. Therefore, by moving the conveyor 41 at a relatively constant speed, a holding layer 23 with non-woven fabric 23f containing uniformly distributed activated carbon granules 21 (see FIG. 3(B)) is formed having a substantially uniform thickness on the conveyor 41.

Preferably, the non-woven fabric 23f of the holding layer 23 is made of polybutylene terephthalate (PBT) or the like. In addition, the diameter of the resin fibers F formed by the fiber-forming nozzle 44 may preferably determined to be between 20 μm and 60 μm. With this range determination of the diameter of the resin fibers F, the number of the fibers can be increased without increasing the resistance to the passage of the flow of intake air. In addition, because activated carbon granules 21 are contained in the resin fibers F, the performance of the holding layer 23 for holding the activated carbon granules 21 may be improved.

In this specification, the description "diameter of resin fibers" is used to mean an average diameter of resin fibers, unless otherwise noted.

As shown in FIG. 2, the holding layer 23 is interleaved between cover layers 24 (i.e., cover layers 24 are located on opposite sides of the holding layer 23). The cover layers 24 are also formed from a non-woven fabric 24f including synthetic resin fibers. The cover layers 24 are intended to protect the holding layer 23 from flames produced when an engine backfires. Therefore, the diameter of the fibers of the non-woven fabric 24f is chosen so as to not easily melt or be broken by the backfire flames.

Figure 4:
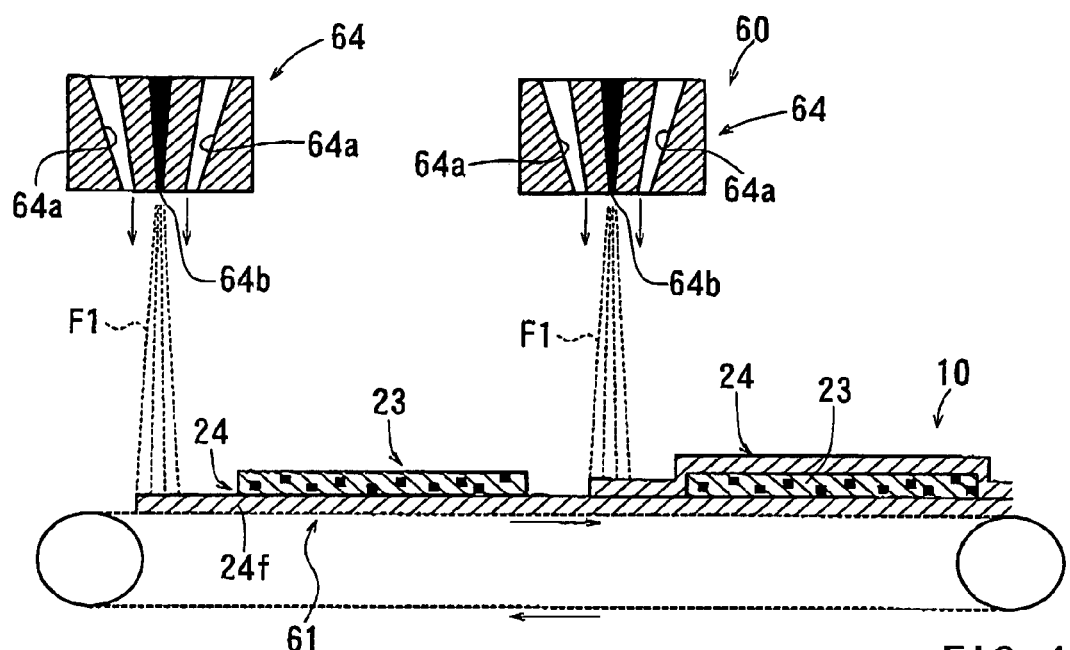
FIG. 4 is a schematic view showing a representative method or apparatus for manufacturing the filter.

A representative apparatus and a representative method for manufacturing the fuel vapor adsorption filter 10 will now be described. Referring to FIG. 4, a representative apparatus for manufacturing the fuel vapor adsorption filter 10 includes a non-woven fabric manufacturing apparatus 60 for manufacturing the cover layers 24.

The non-woven fabric manufacturing apparatus 60 includes a conveyor 61 and two fiber-forming nozzles 64 disposed above the conveyor 61 and spaced apart from each other by a predetermined distance. The construction of each of the fiber-forming nozzles 64 is substantially the same as the fiber-forming nozzle 44 of the non-woven fabric manufacturing apparatus 40 for the holding layer 23. Consequently, each of the fiber-forming nozzles 64 has a central resin injecting hole 64b for ejecting molten resin and hot air blowing holes 64a for blowing hot air towards the molten resin ejected from the injection hole 64b, forming resin fibers F1.

The resin fibers F1 (in a semi-melted state) formed by the fiber-forming nozzle 64 on an upstream side of the conveyor 61 are continuously laid on top of the conveyor 61. The conveyor 61 is moved at a relatively constant speed so that the non-woven fabric 24f forming the cover layer 24 on one side (i.e., the lower side as shown in FIG. 4) is formed having a substantially uniform thickness. The previously formed holding layer 23 is then placed on top of the non-woven fabric 24f so that the cover layer 24 moves together with the holding layer 23 and passes through a position located below a fiber-forming nozzle 64 disposed on the downstream side. As a result, the resin fibers F1 formed by the downstream side fiber-forming nozzle 64 are laid on top of the non-woven fabric 23f of the holding layer 23 to form a cover layer 24 on the upper side. The upper side cover layer 24 is also formed having a substantially uniform thickness.

Figure 5:
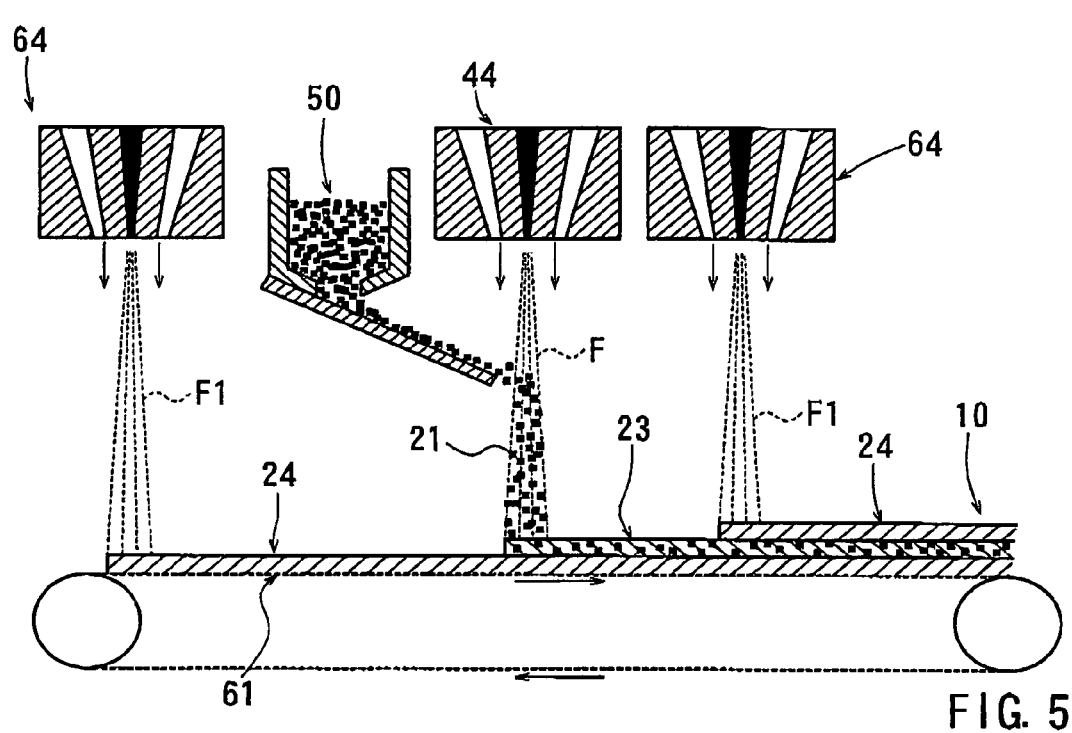
FIG. 5 is a schematic view showing another representative method or apparatus for manufacturing the filter.

Alternatively, as shown in FIG. 5, the fiber-forming nozzle 44 used for forming the holding layer 23 and the activated carbon supply device 50 may be positioned between the fiber-forming nozzles 64 respectively positioned on the upstream side and the downstream side of the conveyor 61. With this arrangement, the holding layer 23 may be directly formed on the lower cover layer 24. Thereafter, the upper cover layer 24 may be formed on top of the holding layer 23. In this way, it is possible to continuously form the fuel vapor adsorption filter 10. Polybutylene terephthalate (PBT), polypropylene (PP), etc, may preferably be used as the material of the non-woven fabric 24f of the cover layers 24. Optionally, a fire retardant, such as phosphorous or halogen fire retardant, may be mixed together with the non-woven fabric 24f in order to improve the heat resisting property of the cover layers 24.

Figure 6:
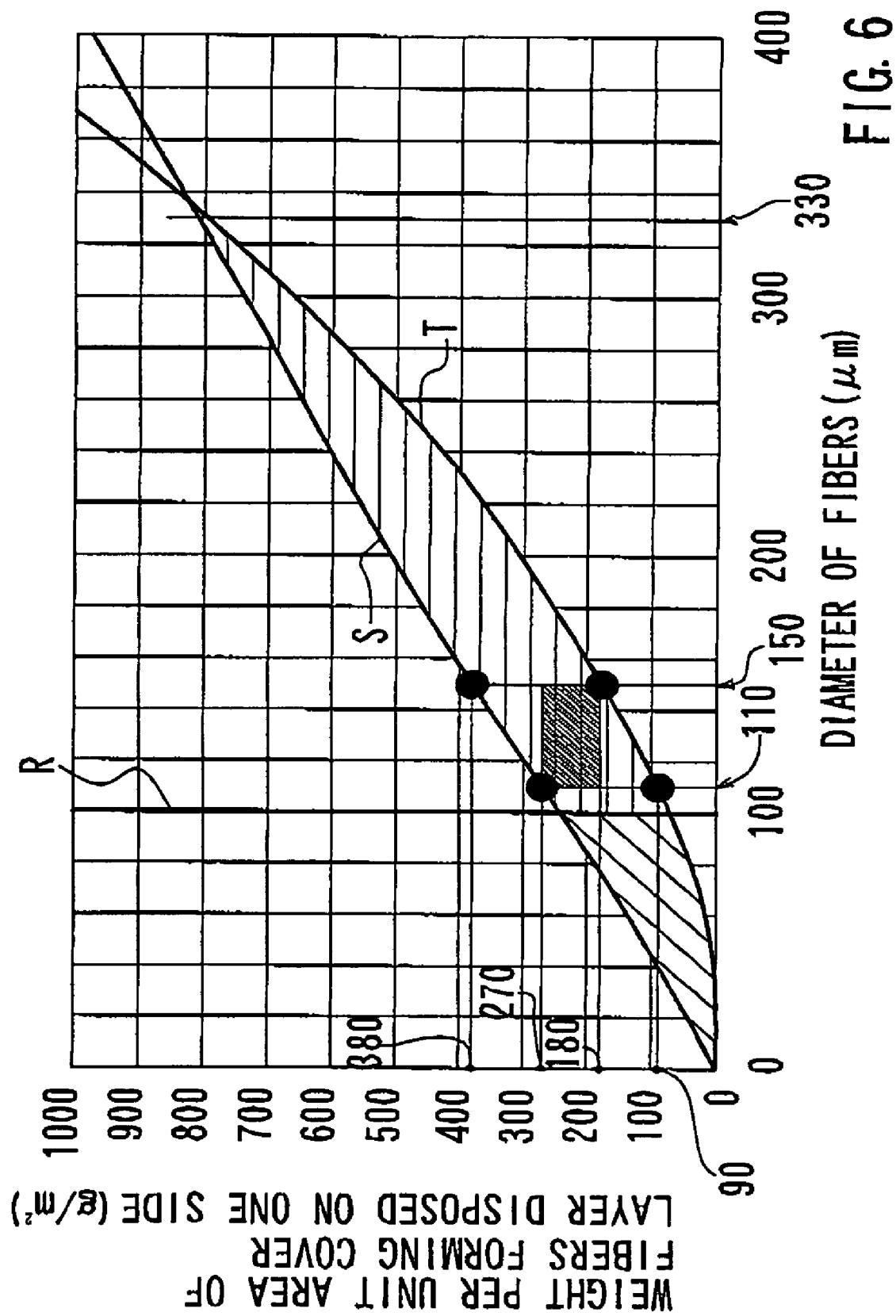
FIG. 6 is a graph usable for determining the diameter of fibers and the weight per unit area of the cover layer.
Figure 7:
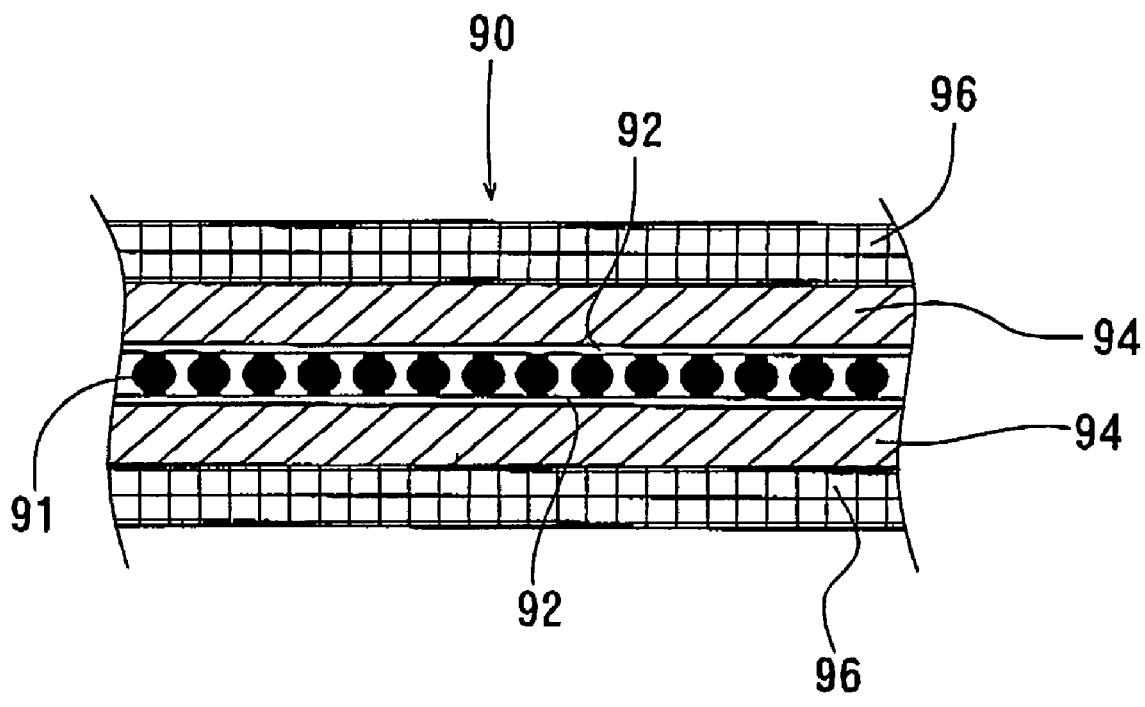
FIG. 7 is a schematic vertical sectional view of a known fuel adsorption filter.

FIG. 6 shows a graph that is usable to determine the diameter and the weight per unit area of the resin fibers F1 constituting the non-woven fabrics 24f of the cover layers 24. The weight per unit area on the ordinate axis is for one of the cover layers 24 covering one side of the holding layer 23.

In FIG. 6, a bold vertical line R is a reference line defining a minimum level for preventing the resin fibers F1 from being melted and broken by backfire flames. Thus, the reference line for this embodiment corresponds to 100 µm for the diameter of the resin fibers F1. This means that a non-woven fabrics 24f of the cover layers 24 may not be melted and broken by engine backfire flames if the diameter of the resin fibers F1 is larger than 100 µm.

In FIG. 6, a curved line T is a reference line for reliably holding the activated carbon granules 21 by the non-woven fabric 24f of the cover layer 24. Thus, if the weight per unit area of the non-woven fabric 24f exceeds the curved line T, it is possible for the cover layer 24 to reliably hold the activated carbon granules 21. For example, if the diameter of the resin fibers F1 of the cover layer 24 is 110 µm, a weight per unit area of greater than 90 g/m$^2$ may be required for reliably holding the activated carbon granules 21. If the diameter of the resin fibers F1 of the cover layer 24 is 150 µm, a weight per unit area of greater than 180 g/m$^2$ may be required for reliably holding the activated carbon granules 21.

In FIG. 6, a linear inclined line S is a reference line for a permissible resistance level to the passage of air through the non-woven fabric 24f of the cover layer 24. Thus, if the weight per unit area of the non-woven fabric 24f is less than the linear inclined line S, the resistance against the passage of air through the non-woven fabric 24f of the cover 24 may be at or below a permissible level of resistance. For example, if the diameter of the resin fibers F1 of the cover layer 24 is 110 µm, a weight per unit area of less than 270 g/m$^2$ may provide a permissible level of resistance to the passage of intake air. If the diameter of the resin fibers F1 of the cover layer 24 is 150 µm, a weight per unit area of less than 380 g/m$^2$ may provide a permissible level of resistance against the passage of intake air.

With the fuel vapor adsorption filter 10 of this representative embodiment, the diameter of the resin fibers F1 of the non-woven fabrics 24f of the cover layers 24 is preferably chosen to be between 110 µm, and 150 µm. In addition, the weight per unit area of each cover layer 24 is preferably chosen to be between 90 g/m$^2$ and 380 g/m$^2$.

However, for the cover layer 24 positioned on the side of the fuel vapor adsorption filter 10 that is not affected by the backfire flames (i.e., the cover layer 24 that covers the surface of the holding layer 23 on the side of the intake air passage containing the air cleaner element 5 or the upstream side with respect to the flow direction of the intake air), it is not necessary to strongly consider the melting and breaking of the fibers due to the backfire flames. Therefore, the resin fibers F1 may have a diameter of less than 100 µm. The weight per unit area of the resin fibers F1 of the non-woven fabric 24f of the cover layer 24 may be selectively determined within a range surrounded by the curved line T and the linear inclined line S in FIG. 6.

In an alternative embodiment, the cover layer 24 disposed on the side of the fuel adsorption filter 10 that is not affected by the backfire flames may be eliminated.

The weight per unit area of the resin fibers F of the non-woven fabric 23f of the holding layer 23 may also be determined from the graph shown in FIG. 6 so as to correspond to the diameter (20 µm to 60 µm) of the resin fibers F.

As described above, according to the fuel vapor adsorption filter 10 of this representative embodiment, the cover layer 24 disposed on at least one side (i.e., the downstream side (engine side) of the intake air channel) is made of the non-woven fabric 24f in which fibers F1 are intricately overlapped in comparison with those of the known heat resisting net. Thus, the number of the fibers F1 in the non-woven fabric 24f may be greater than the number of the fibers in the known net, assuming that the weight per unit area is the same. In addition, because the fibers F1 are intricately intertwined in the cover layer 24, the mesh of the cover layer 24 may appear to be finer than the mesh of the known net, assuming that the resistance to the passage of intake air is the same. Further, the cover layer 24 may not be melted and broken as a result of instantaneous engine backfire flames since the diameter of the non-woven fabric 24f forming the cover layer 24 is chosen to be between 110 µm and 150 µm and therefore provides a sufficient heat resistant capacity.

As described above, assuming that the resistance against the passage of air is the same, the number of overlapped fibers F1 in the non-woven fabric 24f of the cover layer 24 is greater than those of the known net. In addition, the appearance of the mesh of the non-woven fabric 24f is finer than that of the know net. Therefore, the performance of the holding layer 23 for protecting the activated carbon granules 21 can be improved.

Further, by choosing the diameter of the resin fibers F1 of the non-woven fabric 24f forming the cover layer 24 to be less than 330 μm, the cover layer 24 may have qualities of a low resistance performance against the passage of air and an improved performance for holding the activated carbon granules 21, without an impermissible increase in the weight per unit area of the cover layer 24.

In addition, according to the representative method of manufacturing the fuel vapor adsorption filter 10, the formed resin fibers F1 are directly laid above or below the non-woven fabric 23f of the holding layer 23 in order to form the non-woven fabric 24f of the cover layer 24. Therefore, the non-woven fabric 24f of the cover layer 24 and the non-woven fabric 23f of the holding layer 23 may be bonded to each other at the same time that the non-woven fabric 24f is formed or at the same time that the non-woven fabric 23f is formed. Therefore, it is possible to prevent the activated carbon granules 21 contained in the non-woven fabric 23f from being damaged by a flapping or moving cover layer 24 during the manufacturing operation of the filter 10.

Furthermore, the non-woven fabric 24f of the cover layer 24 is composed of formed resin fibers F1 that have a relatively long length (average length). Therefore, the heat capacity of the cover layer 24 may be increased and a potential fuzziness of the surface of the non-woven fabric 24f may be reduced, so that the cover layer 24 may be further prevented from being melted and broken.

Still furthermore, the diameter of the resin fibers F of the non-woven fabric 23f forming the holding layer 23 is chosen to be between 20 μm and 60 μm and is therefore relatively thin. As a result, it is possible to increase the number of the fibers while minimizing an increase in the resistance to the passage of air. Inclusion of the activated carbon granules 21 among such thin fibers F of the non-woven fabric 23f may ensure that the activated carbon granules 21 are reliably held by the non-woven fabric 23f.

Other Possible Embodiments

The present invention may not be limited to the above representative embodiments but may be modified in various ways. For example, activated carbon granules 21 are used as the adsorption agent in the above representative embodiments. However, activated carbon fibers or any other material that can adsorb fuel vapor may be used as the adsorption agent.

The invention claimed is:

1. A fuel vapor adsorption filter for mounting within an intake air channel connected to an engine and extending across the intake air channel in order to absorb a fuel vapor within the intake air channel when the engine has been stopped, the fuel vapor adsorption filter comprising:
    an adsorbing agent for adsorbing the fuel vapor;
    a holding layer comprising a first non-woven fabric and arranged and constructed to contain and hold the adsorbing agent wherein the first non-woven fabric is formed of thermoplastic resin fibers;
    a cover layer comprising a second non-woven fabric and arranged and constructed to cover at least one side of the holding layer opposing the downstream side of the intake air channel, wherein the second non-woven fabric is formed of thermoplastic resin fibers;
    wherein the thermoplastic resin fibers forming the second non-woven fabric of the cover layer have an average diameter between 100 μm and 330 μm;
    wherein an average diameter of the thermoplastic resin fibers of the second non-woven fabric is between 110 μm and 150 μm; and
    wherein a weight per unit area of the second non-woven fabric is between 180 g/m$^2$ and 270 g/m$^2$.

2. A fuel vapor adsorption filter for adsorbing a fuel vapor contained in an air within an intake air channel connected to an engine, the fuel vapor adsorption filter comprising:
    an adsorption agent for adsorbing the fuel vapor, wherein the adsorption agent comprises a plurality of adsorption granules or fibers;
    a first non-woven fabric containing the adsorption granules or fibers, wherein the adsorption granules or fibers are substantially uniformly distributed within the first non-woven fabric;
    a second non-woven fabric covering the first non-woven fabric;
    wherein the first non-woven fabric and the second non-woven fabric are respectively configured as a first layer and a second layer laid over at least one side of the first non-woven fabric;
    wherein the second non-woven fabric comprises resin fibers having an average diameter of between 100 μm and 330 μm;
    wherein the average diameter of the fibers of the second non-woven fabric is between 110 μm and 150 μm; and
    wherein a weight per unit area of the second non-woven fabric is between 180 g/m$^2$ and 270 g/m$^2$.

* * * * *